Oct. 4, 1960 R. G. HEFT ET AL 2,954,689
COMBINATION WASHING AND EXTRACTING MACHINE
Filed Nov. 30, 1955 7 Sheets-Sheet 1
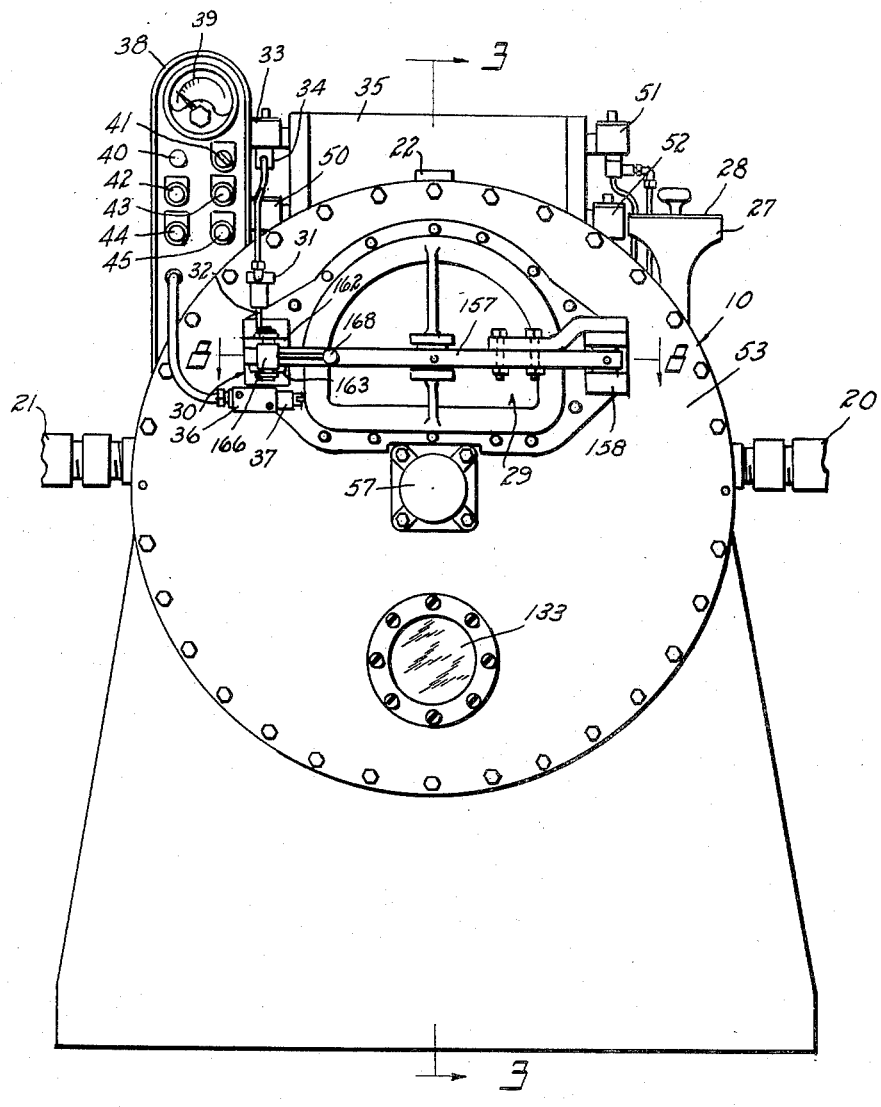
Fig_1_
INVENTORS
ROBERT G. HEFT
EDWARD J. O'NEIL
BY GABRIEL D. D'AGOSTINO
Lindsey and Preutzman
ATTORNEYS Oct. 4, 1960   R. G. HEFT ET AL   2,954,689
COMBINATION WASHING AND EXTRACTING MACHINE
Filed Nov. 30, 1955   7 Sheets-Sheet 2
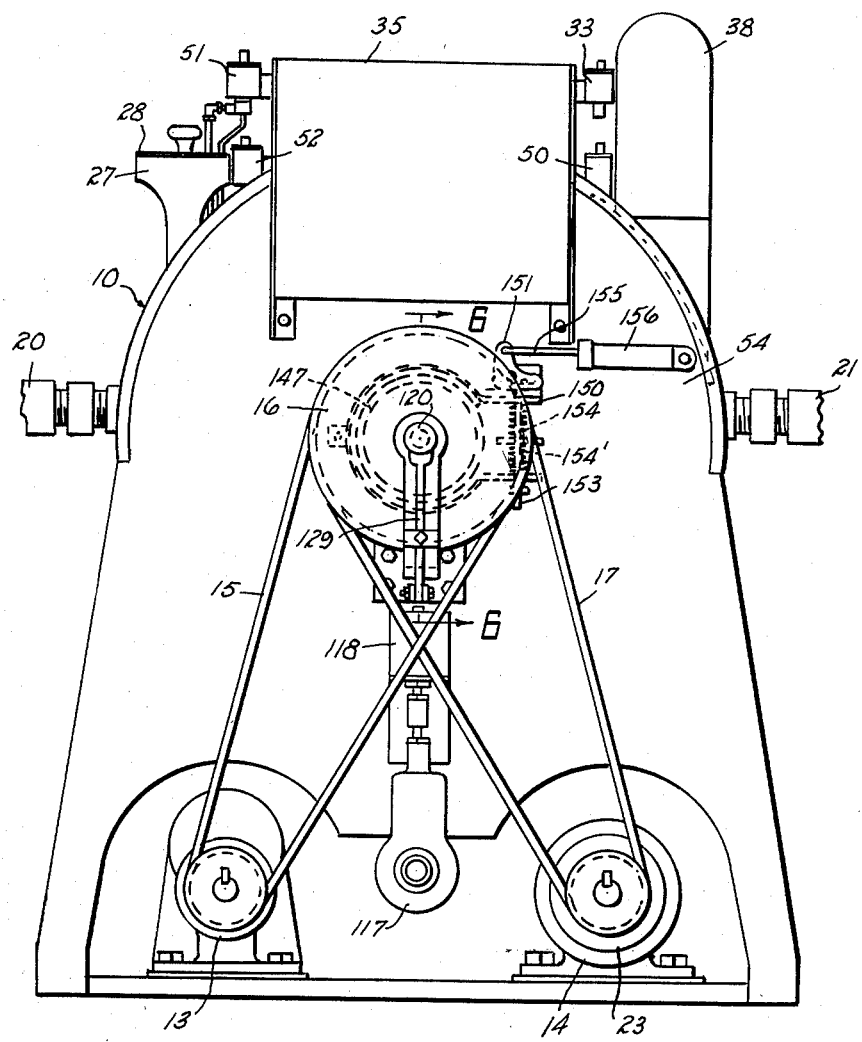
Fig-2-
INVENTORS
ROBERT G. HEFT
EDWARD J. O'NEIL
BY GABRIEL D. D'AGOSTINO
*Lindsey and Prutzman*
ATTORNEYS

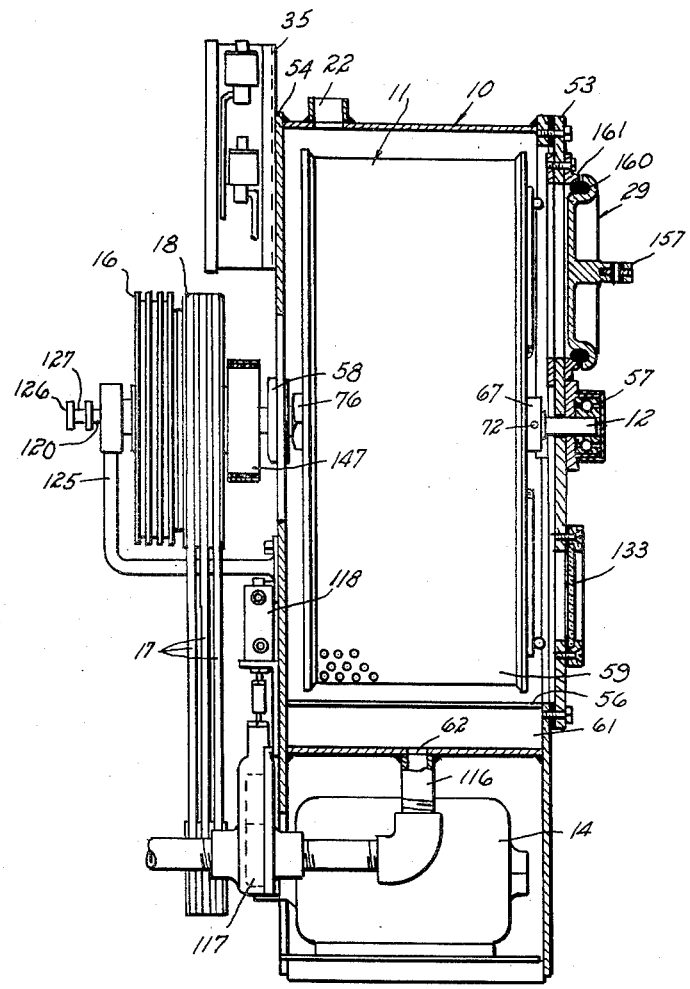

Oct. 4, 1960 R. G. HEFT ET AL 2,954,689
COMBINATION WASHING AND EXTRACTING MACHINE
Filed Nov. 30, 1955 7 Sheets-Sheet 4
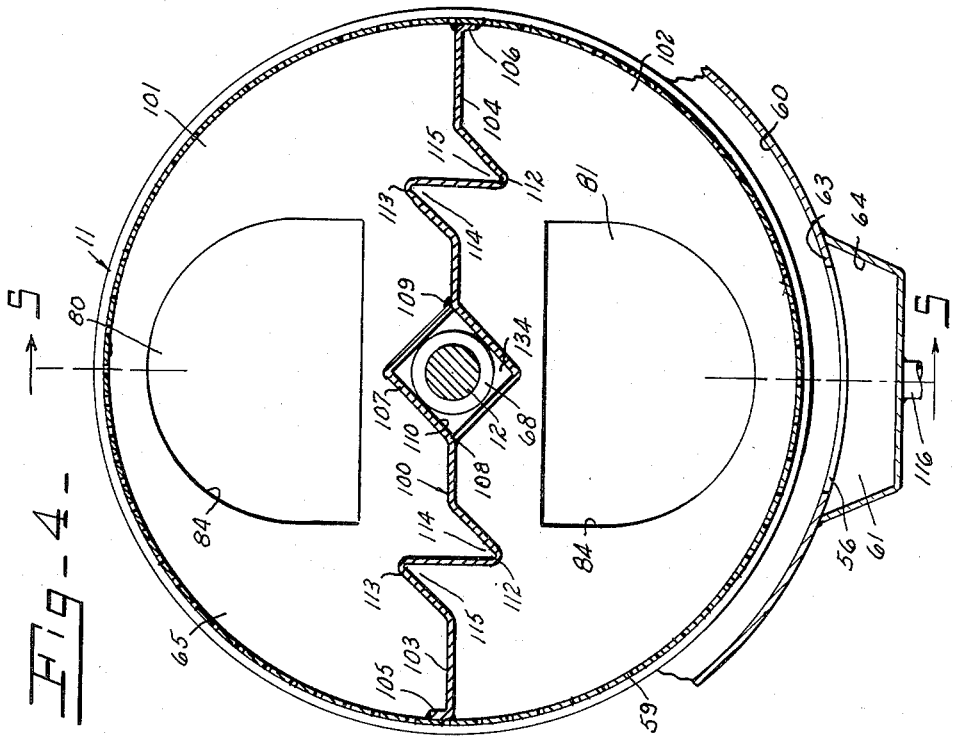
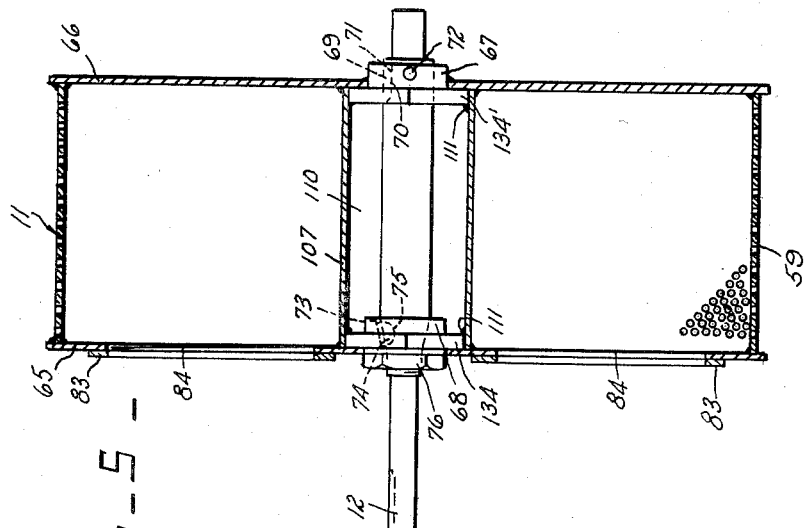
INVENTORS
ROBERT G. HEFT
EDWARD J. O'NEIL
BY GABRIEL D. D'AGOSTINO
*Lindsey and Prutzman*
ATTORNEYS

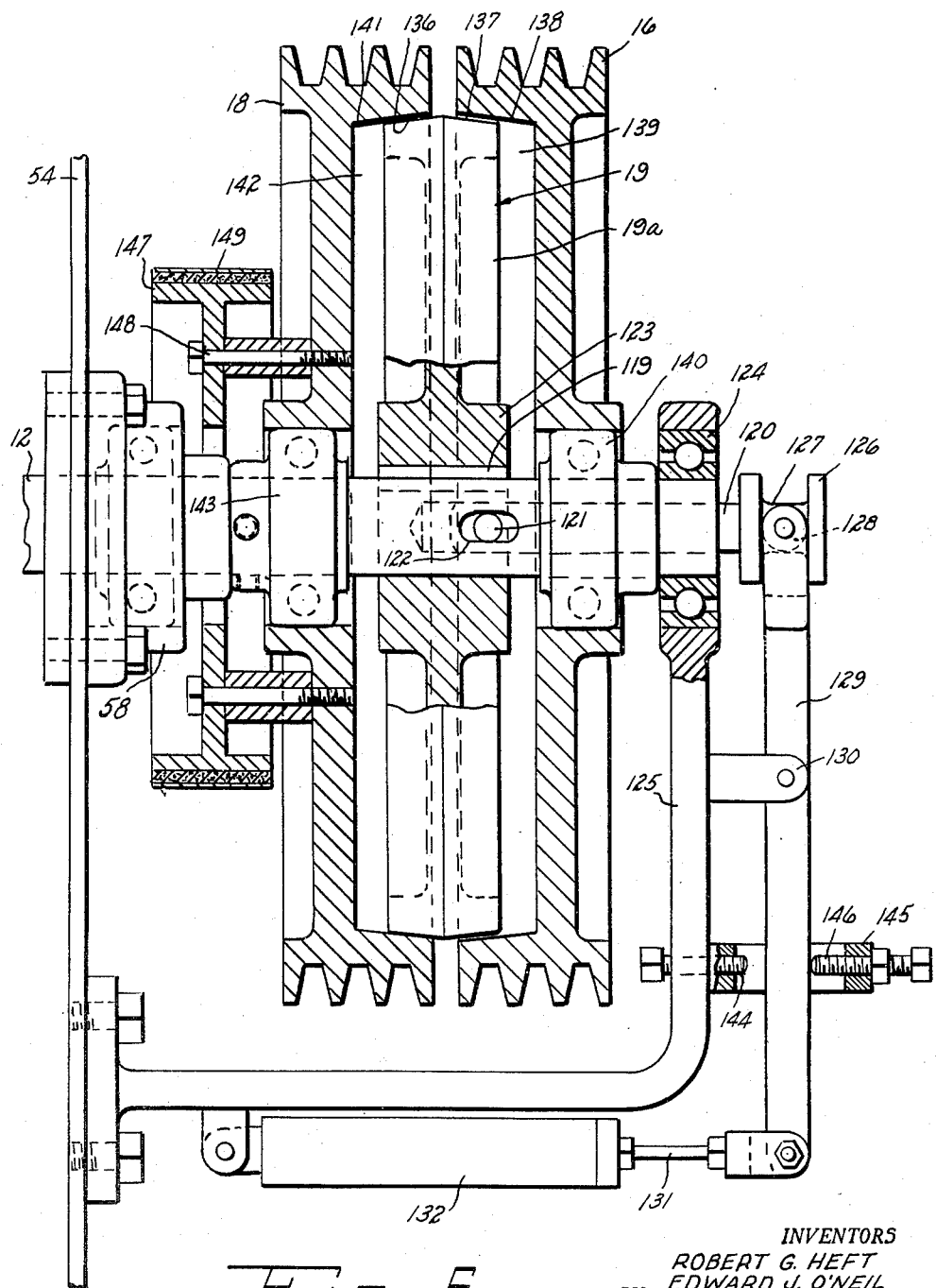

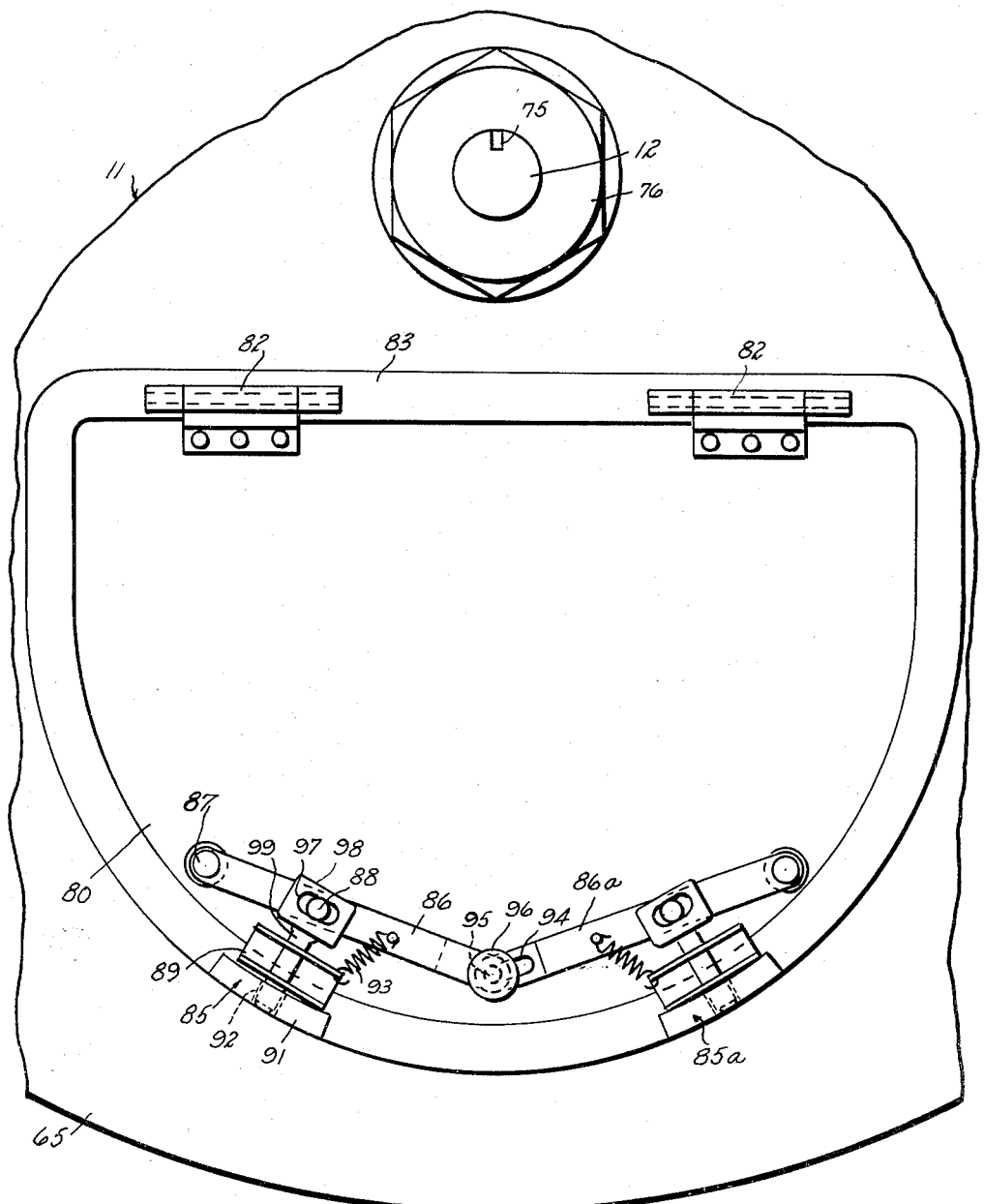

United States Patent Office 2,954,689
Patented Oct. 4, 1960

2,954,689

COMBINATION WASHING AND EXTRACTING MACHINE

Robert G. Heft and Edward J. O'Neill, Syracuse, N.Y., and Gabriel D. D'Agostino, Forestville, Conn., assignors to G. A. Braun, Inc., Syracuse, N.Y., a corporation of New York Filed Nov. 30, 1955, Ser. No. 550,094

3 Claims. (Cl. 68—24)

This invention relates to a new combination washing machine and extractor which has particular utility for commercial application.

The washing performance of combination washing machines and extractors heretofore available has not been entirely satisfactory in that normally it is necessary to utilize a large quantity of water and soap or detergent to obtain the best results of which the machines are capable, and unfortunately even then the results obtained with such combination machines still fall short in desired dirt removing performance. Such machines have been even less satisfactory in their use as extractors in that the moisture content of the clothes or material after extraction is usually so high that it is necessary to provide an additional drying operation in a separate machine such as a heat dryer to place the clothes or material in proper condition for finish ironing. Also, during the extraction cycle the clothes or other material being processed often become very tightly packed, necessitating a loosening up of the pack prior to the next operation. To loosen the pack, a separate machine commonly referred to as a "shake-up tumbler" may be used. The necessity for these extra operations of drying and shaking out, of course, constitute a substantial proportion of the overall cost of the operation as well as requiring excessive handling of the material. This extra handling may quite conceivably result in some of the material being dirtied again thus necessitating a rewashing. Also, the removal of the tightly packed material from the machine following the extracting operation results in an all too frequent tearing of individual pieces due to the force necessary to split up the pack and remove it from the machine for shaking out.

In certain cases the undesirable requirements that material after having undergone the extracting operation in a combination washing machine and extractor must still be processed through additional drying and shake-out operations, has lead laundry operators to depart from the use of such combination machines and provide a separate high-speed extractor which will accomplish the desired objective of moisture removal from the material in one operation. However, in the use of such extractors, a shake-out operation is still required as the packing problem heretofore mentioned is even more noticeably present, due to the fact that normally the separate extracting machines operate at a considerably greater rotative speed than does the usual combination machine during the extracting cycle.

It is therefore a purpose of this invention to provide a combination washing machine and extractor having improved washing action and further providing for the extraction of sufficient moisture from the washed material to obviate the necessity for further drying of the material prior to finishing.

It is another object of this invention to provide a combination washing machine and extractor of the type described which obviates the necessity for transferring the clothes or material to a separate machine for shaking out following the extracting operation.

It is still another object of this invention to provide a machine of the type described capable of semi-automatic operation wherein the washing, rinsing, and extracting cycles may be accomplished without constant attention of an operator.

It is further an object of this invention to provide a machine of the type described having improved safety features, improved economy of operation and improved structural integrity in order to assure long and trouble-free service even under the most adverse conditions.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a front elevation of a combination washing machine and extractor constructed in accordance with this invention;

Fig. 2 is a rear elevation of the machine of Fig. 1;

Fig. 3 is a sectional side view of the machine along the lines 3—3 of Fig. 1;

Fig. 4 is a sectional view of the clothes basket of the machine of Fig. 1;

Fig. 5 is a sectional view along the line 5—5 of Fig. 4;

Fig. 6 is a sectional view along the lines 6—6 of Fig. 2;

Fig. 7 is a fragmentary front elevation of the clothes basket of Fig. 4 showing an access door therein.

Figure 8:
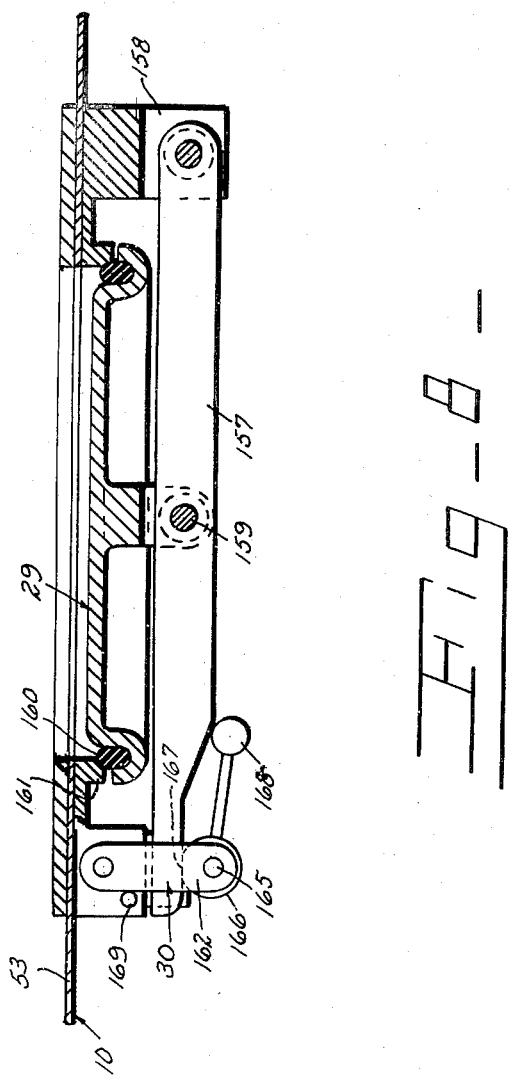
Fig. 8 is a fragmentary sectional view along the lines 8—8 of Fig. 1.

With reference to the drawings and particularly Figs. 1 to 5, a machine constructed in accordance with the present invention is comprised generally of a tub portion 10 having an interior of circular cross section in which is received for rotation a cylindrical clothes basket 11 mounted on a drive shaft 12. The tub portion 10 is provided with a pedestal portion which supports the tub and in which is mounted a washing drive motor 13 and an extracting drive motor 14. The washing motor 13 is connected by means of a belt 15 to a pulley 16 to provide rotation of the clothes basket 11 during the washing cycle and the extracting motor 14 is connected by means of a belt 17 to a pulley 18 to provide rotation of the clothes basket during the extracting cycle. Separate motors are provided for washing and extraction in order to provide a low speed rotation of the clothes basket during washing and a very high speed rotation of the basket during extraction. In order to provide smooth starting of the extraction cycle and to prevent possible damage to the machine a fluid drive means 23 such as a fluid clutch drivingly connects the motor 14 and the belt 17. A friction clutch 19, operatable in a manner to be hereafter described, serves to drivingly connect the clothes basket 11 with either the washing motor 13 or the extracting motor 14 as determined by the cycle of operation to be performed. An inlet pipe 20 connected to the tub 10 serves to provide for the introduction of water into the tub during the washing and rinsing operations, and a drain pipe 21 is located diametrically opposite the pipe 20 to provide for a drain of excess water from the machine during the rinsing operation. The drain pipe 21 therefore provides for a constant drain of water from the tub if during the rinsing operation water is continually introduced into the tub through the inlet pipe 20. A vent tube 22 is provided in the top of the tub portion 10 to vent air and steam from the machine. A receptacle 27 is provided on the upper portion of the tub 10 in communication with the interior of the tub and into which soap or detergent may be inserted for use during the washing cycle. The receptacle 27 is provided with a cover 28 to preclude any undesirable backing up of fluid through the receptacle 27.

A door 29, hereinafter referred to as the outer door, is provided in the front face or end wall 53 of the tub portion 10 to provide access to the interior of the tub portion and the clothes basket 11. A latch 30, to be hereinafter described in detail, serves to lock the outer door 29 in closed position and is provided with a safety lock 31 having a locking rod 32 movable into and out of engagement with the latch 30, in a manner to be hereinafter described, to prevent undesired opening of the latch during the extracting cycle. The movement of the locking rod 32 is effected by a control element 33, such as an air valve, which in turn is controlled by means of a solenoid 34, located on the side of a housing 35 which is mounted on the upper portion of the tub and which contains the control mechanisms necessary for the proper sequential operation of the machine. A detailed description of these control mechanisms and their function will be described below. A safety switch 36 is also provided on the front face of the tub portion 10 as shown in Fig. 1, and has a plunger element 37 engageable with the rim of the door 29. This safety switch prevents the operation of the machine while the door 29 is open, in that opening of the door will permit the plunger 37 to be extended by a mechanism (not shown) in the switch which will cause the main electrical circuit to the machine to be opened, thus preventing any energizing of the electrical driving elements of the machine.

Mounted in upstanding fashion on the top portion of the tub 10 is a control panel 38 on which is mounted a timer 39, an indicating light 40, an on-and-off switch 41, a starting switch 42, a jogging control switch 43, a stop switch 44 and an extracting switch 45. Electrical connection means (not shown) are provided to connect the control elements mounted on the panel 38 with the control mechanisms contained within the control housing 35. Mounted on the sides of the control housing 35 in addition to the safety latch solenoid 34 is a brake solenoid 50, a clutch solenoid 51 and a dump valve solenoid 52. The function of the solenoids 50, 51 and 52 will be hereinafter explained in detail.

With particular reference to Figs. 3, 4, and 5, the clothes basket 11 in which the material to be processed is contained during the various operating cycles is rotatably mounted in the end walls 53, 54 by means of a drive shaft 12 which extends through the end wall 53 and is journaled in a bearing assembly 57 mounted on the end wall 53. The other end of the drive shaft 12 extends through the end wall 54 and is journaled in a bearing assembly 58 mounted on the end wall 54. This other end of the drive shaft further extends axially of the pulleys 16 and 18 and clutch 19 and is selectively engageable through the clutch 19 with either of the pulleys, as will be hereinafter described, to provide rotation of the basket 11 within the tub.

The basket 11, as heretofore described, is of cylindrical shape and has a perforated peripheral wall 59 through which water and detergent may enter for contact with material in the clothes basket, and through which water extracted from the clothes during the extracting operation may pass for drainage out of the machine. As shown in Fig. 4, the peripheral wall 59 of the clothes basket is disposed in close periphery to the inner surface 60 of the tube 10, thus reducing the volume of solution required to be introduced into the machine for washing and thus providing a reduction in the cost of operating the machine.

The perforated peripheral wall 59 is closed at its ends by a front panel 65 and a rear panel 66. The front panel 65 and rear panel 66 are provided with centrally disposed collars 67 and 68, each provided with an aperture in alignment with the axis of rotation of the drive shaft 12 to permit extension of the drive shaft therethrough. The collar 67 is provided with axial keyway 69 registerable with a correspondingly shaped keyway 70 axially disposed on the drive shaft. A key 71 is disposed in the keyways to rotatably lock the collar 67 relative to the drive shaft. The collar 67 is also provided with a set screw 72 theadably received therein for locking engagement with the drive shaft. The periphery of the aperture in the collar 68 is formed with a taper mating with a corresponding taper on the drive shaft 12. A keyway 73 in the collar 68, a key 74, and a keyway 75 in the drive shaft serve to rotatably lock the collar 68 relative to the drive shaft. A locking nut 76 is threadably received on the drive shaft to draw the shaft into engagement with the collar 68 and thus prevent axial movement of the shaft relative to the collar. By this mounting it is possible to disassemble the drive shaft from the basket, which may be desirable in the event of damage to either part requiring replacement or repair work to be done thereon.

With reference particularly to Figs. 4, 5 and 7, the front panel 65 is provided with a pair of wide diametrically disposed doors 80 and 81, hereinafter referred to as the inner doors, through which the basket may be loaded with material to be cleaned. The inner doors are positioned so as to be registerable with the outer door 29 and each inner door is hinged as at 82 on a frame 83 mounted on the front panel 65 and surrounding the door aperture 84. The inner doors are mounted so as to open outwardly and downwardly when in registry with the outer door 29 and when the outer door 29 has been opened and are secured in a closed position by means of a pair of interconnected latches 85 and 85a having operating levers 86, 86a. Inasmuch as the latches 85, 85a are identical only the latch 85 will be described in detail. The operating lever 86 is pivoted at one end to the door as at 87 and has pivotally mounted thereon intermediate its ends a pin 88 slidably received in an elongated slot 97 in the head 98 of a bolt 99. A guide member 89 mounted on the door is provided with apertures in which is slidably received the bolt 99. A strike 91 fixed to the door frame 83 is provided with apertures in which is slidably received the end of the bolt 99 to lock the door in its closed position. A spring 93 is connected at one end to the operating lever 86 and at the other end to the guide member 89 to urge the operating lever in a latch-closing direction. The other ends of the operating levers 86 and 86a are interconnected by means of a slot 94 disposed longitudinally of the lever 86a and a pin 95 mounted on the other end of the operating lever 86 and slidably received in the slot 94. An operating knob 96 is mounted on the pin 95 to permit manual and simultaneous actuation of the latches. As can be seen from Fig. 7, when the knob 96 is moved radially inwardly of the basket, the operating arms 86 and 86a will be pivoted in a counterclockwise and clockwise direction respectively to withdraw the bolts out of engagement with the strikes to permit opening of the door. As can be further seen, the construction of the latches 85 and 85a is such that the disposition of the operating elements relative to the rotational axis of the basket 11 assures that during rotation of the basket centrifugal force acting upon the operating elements will tend to keep the latches in a closed position, thus assuring that the inner doors will not inadvertently open during rotation of the basket.

With reference to Fig. 1 a sight glass 133 is provided in the front face of the tub to assist the operator in rotatably locating the basket in a position wherein one of the inner doors is in registry with the outer door as when a knob 96 on one of the inner doors is visible through the sight glass the other inner door is in registry with the outer door.

It should further be noted that when one of the inner doors is in registry with the outer door, the door will be in a rotated position diametrically opposite that shown in Fig. 7. Thus, the door will open outwardly and downwardly of the basket 11 to extend through the opening in the front face of the tub covered by the outer door 29. It is one of the safety features of a machine constructed in accordance with the invention that if an inner door is not latched securely when closed, it will fall open due to the disposition of the latches relative to the hinges on the opposite edge of the door. This, of course, will prevent the outer door from being closed and further prevent the machine from being operated.

With particular reference to Figures 4 and 5 and in accordance with the invention, the basket 11 is provided with a diametrically disposed imperforate baffle or partition 100 of novel and improved construction which divides the basket into two generally semi-cylindrical compartments 101, 102, each of which is serviced by one of the inner doors 80, 81. The partition 100 maintains a more even distribution of the weight of the load in the basket and serves to minimize tangling of the material during rotation of the basket. The partition 100 is comprised of two sections, 103 and 104, each having a flange 105, 106 at its outer end which is secured as by welding to the peripheral wall 59 of the basket. Each of the sections 103, 104 is in the specific embodiment fabricated from a single piece of sheet metal resulting in a relatively inexpensive yet structurally satisfactory member. A ridge or corrugation 107 having a generally V-shaped cross section and extending parallel to the axis of rotation of the basket is provided at the other end of each partition section. The two sections are joined as at 108, 109 such as by welding to provide an aperture 110 in which is received the collars 67 and 68. The collars 67, 68 each have a respective flange 134, 134' corresponding to the cross section of the aperture 110 and secured to the partition sections 103, 104 as at 111 by suitable means such as welding to form a driving connection between the collars and the basket 11. Each of the partition sections is formed intermediate its ends with ridges 112 and 113 extending in opposite directions and preferably somewhat lesser in height than the central ridge 107. The construction of the ridges 112 and 113 is such that there is provided immediately radially inwardly of the ridge 112 and radially outwardly of the ridge 113 a valley or recess 114, 115 respectively, for a purpose to be hereinafter explained.

During the operation of the machine in the washing cycle, the basket 11 may, as will be hereinafter seen, be rotated alternately in a counterclockwise or forward and counterclockwise or reverse direction as viewed in Fig. 4. Assuming a counterclockwise or forward direction of rotation, the material in the compartments 101 and 102 is lifted out of the washing solution by the upwardly moving side of the partition 100. When the partition reaches a relatively steep angle the clothing then in the upper compartment has been raised to a substantial height above the level of the liquid in the basket and slides or tumbles downwardly to the lowermost part of the compartment. In so doing, the material slides and rubs across the upraised ridges on the partition and is thereby automatically subjected to a scrubbing or washboard action. Rotation of the basket another one-half revolution will impart the same scrubbing action to the material in the other compartment while bringing the partition again into elevating engagement with the material in the first compartment. Thus, the full load in the basket is subjected to this washboard scrubbing action once each revolution of the basket, which contributes substantially to the speed and effectiveness of the washing action while materially reducing tangling.

The valleys 114 and 115 formed in the partition sections impart a scooping action which serves to greatly increase the churning or agitation of the washing solution as the partition is moved through the solution to appreciably increase the effectiveness of the washing action by causing the material or clothes in the basket to be tossed about in the solution, thus also tending to keep separated the individual pieces being washed and reducing tangling thereof. Further, these recesses or valleys assist in elevating washing solution with the material when the material is raised to a dropping position, thus always maintaining a good supply of washing solution in contact with the material. As can be seen, the washing action described above is the same, regardless of direction of rotation of the basket due to the symmetrical construction of the partition 100. It has been found that when material is washed in a machine embodying the novel structure of the partition 100 a visible improvement is evidenced over the results obtained by washing in a machine not embodying this novel improvement.

It should also be noted that material sliding down across the partition 100 will fall into the somewhat wedge-shaped portion of each compartment formed by the junction of the partition 100 with the peripheral wall of the basket. Therefore, the material is subjected to a wedging or squeezing action which serves to squeeze the washing or rinsing solution through the material to further improve the washing action. While the above description of the function of the basket 11 and partition 100 has been described in terms of washing, it should be apparent that equally improved results are achieved during the rinsing cycle.

Turning now to the use of a machine constructed in accordance with the invention as an extractor, it has been found that during extracting, with the attendant high speed rotation of the basket, the water being removed leaves the basket with considerable velocity in a nearly tangential direction tending to cause the water to follow the basket and thus impeding draining of the water from the tub and further inducing a pumping action in the washer which might have adverse effects on the structural integrity of the machine. To prevent such undesirable action and improve the extracting performance of the machine, a rectangular aperture 56 is provided in the bottom of the tub extending substantially the full length of the tub. This aperture is disposed parallel to the axis of rotation of the basket and is preferably of a width approximately ⅓ of the diameter of the inner surface of the tub. As can be seen in Fig. 4, the aperture 56 is completely unobstructed to provide a free passage of extracted water therethrough. To collect the water extracted, a trough 61 is mounted between the end walls 53, 54 below the aperture with the end walls forming the ends of the trough. The trough is relatively shallow in order not to appreciably increase the quantity of solution necessary for the washing operation and is provided with a drain passage 62 through which water collected in the trough may pass out of the machine. The provision of the aperture 56 serves to break up the flow of water around the inner surface of the tub resulting from the high speed rotation of the basket, thus permitting quick and efficient drainage of the extracted water.

As it has been found that it is possible for some of the extracted water thrown into the trough 61 to impinge upon the side surface 64 of the trough and be deflected upwardly back into the space between the basket and the inner surface of the tub, the trough is provided, in accordance with the invention, with an overhanging lip portion 63 extending entirely around the upper periphery of the trough. This lip is formed by the spacing of the juncture of the sides of the trough to the tub outwardly from the periphery of the aperture 56 and by the fact that the aperture does not extend the full length of the tub. Thus, any water deflected upwardly from the side surface 64 will be again deflected in a downward direction back into the trough to further improve the extracting performance of the machine.

Although the reasons therefor are not completely understood, it has been found that the use as an extractor of a combination washing and extracting machine constructed in accordance with the invention will result in the removal of 5% to 10% more water from the material undergoing extraction over that achieved by the use of a conventional upright extracting machine of comparable size and operated at comparable speed.

To provide for drainage of water from the machine, a drain pipe 116 is connected to the drain passage 62, as best shown in Fig. 3. The flow of water through the drain pipe 116 is controlled by a dump valve 117 which serves to close off the drain pipe during the operation of the machine, when it is desired to retain the water or washing solution in the tub. A control element 118, such as an air valve, which is responsive to actuation of the solenoid 52 hereinbefore mentioned is provided to effect the opening and closing of the dump valve 117.

As mentioned above, a combination washing machine and extractor constructed in accordance with the invention is provided with a clutch 19 whereby the basket 11 may be alternately driven by the washing motor 13 or the extracting motor 14. With particular reference to Figs. 2, 3 and 6, it can be seen that the drive shaft 12 extends rearwardly of the rear wall 54 of the machine and has mounted thereon a clutch element 19a. The clutch element 19a is rotatably engaged by means of a key 119 with the drive shaft but is slidable axially thereof. As can be seen from Fig. 6, there is an axial bore provided in the drive shaft in which is slidably received a clutch control rod 120. A pin 121 on the control rod 120 extends radially through an axial slot 122 provided in the drive shaft and is engaged with the hub portion 123 of the clutch element 19a. As can be seen in Fig. 6 the control rod is rotatably journaled in a bearing 124 mounted on a support arm 125 which, in turn, is mounted on the end wall 54 of the machine. The rightward or outer end of the control rod 120 as viewed in Fig. 6 is provided with an increased diameter portion 126 having an annular recess 127 in which is received a pair of rollers 128 rotatably mounted on one end of a clutch-operating arm 129, pivotally mounted intermediate its ends on a lug 130 extending from the support arm 125. The operating arm 129 is connected at its other end to one end of an actuating plunger 131 of a control element 132 such as an air valve which is responsive to the actuation of the solenoid 51 hereinbefore mentioned. The end of the control element 132 opposite the plunger 131 is pivotally mounted to the support arm 125.

The clutch element 19a is provided with oppositely directed inclined clutch faces 136 and 137. The clutch face 137 is engageable with a corresponding inclined surface 138 provided by an annular recess 139 in the pulley 16 which is mounted to the outer race of a bearing 140, the inner race of which is mounted on the drive shaft. The engaging face 136 of the clutch element 19a is engageable with an inclined surface 141 provided by the annular recess 142 in the pulley 18 which is mounted to the outer race of a bearing 143, the inner race of which is mounted on the drive shaft 12. As is apparent, if the clutch element 19a is moved to the right, as viewed at Fig. 6, the pulley 16 which is connected to the washing motor 13, will be drivingly engaged with the drive shaft and thus the basket 11. On the other hand, if the clutch element is moved to the left, as viewed in Fig. 6, the pulley 16 will be disengaged from the drive shaft and the extracting motor pulley 18 will in turn be rotatively engaged with the drive shaft.

In order to provide that the clutch element will be moved a sufficient distance in either direction to form a firm driving engagement with either the pulley 16 or 18, but yet will not be moved far enough to possibly wedge the engaging surfaces in a manner which would make disengagement difficult, a pair of stops are provided for the clutch-operating arm 129. As can be seen in Fig. 6, a set screw 144 is threadably received in the support arm 125 to limit the pivotal movement of the operating arm 129 in a clockwise direction. A mounting block 145 is supported by the set screw 144 and threadably receives a set screw 146 which serves to limit the counterclockwise pivotal movement of the operating arm 129. Thus, it should be apparent that if the actuating plunger 131 is extended to the right, the clutch operating arm will be pivoted in a counterclockwise direction to move the clutch control rod inwardly of the drive shaft and engage the clutch and drive shaft with the extracting motor pulley 18. If the plunger 131 is moved to the left, of course, the converse would be true and the drive shaft will be engaged with the washing motor pulley 16. In the preferred embodiment when the solenoid 51 is deenergized the control element 132 will place the clutch element in engagement with the extracting motor pulley and thus engage the drive shaft and washbasket with the extracting motor pulley for a purpose which will be hereinafter apparent.

In the specific embodiment, the basket 11 is driven by the extracting motor 14 at a rotative speed of approximately 800 r.p.m. It is therefore desirable to provide some means for quickly stopping rotation of the basket when the extracting cycle has been completed, as otherwise the basket would continue to rotate for a considerable length of time before coming to rest. Accordingly, a brake drum 147 is mounted concentrically with the drive shaft by means of bolts 148 threadably received in the pulley 18. With particular reference to Fig. 2, a brake shoe 149 is mounted in engaging relationship with the periphery of the brake drum 147 and has one end thereof mounted by means of a flange 150 to the end wall 54 of the machine. A bell crank 151 is pivotally mounted on the flange 150 and is connected at one end to a brake actuating lever 153 which is, in turn, engageable with the other end of the brake shoe 149. A pair of springs 154, 154' mounted on the actuating lever 153 serve to urge the ends of the brake shoe away from each other and thus urge the brake shoe 149 out of engagement with the brake drum 147. The other end of the bell crank 151 is connected to an actuating plunger 155 of a control element 156, such as an air valve, which is responsive to actuation of the solenoid 50 hereinbefore mentioned. Thus, as the actuating plunger 155 is moved to the left as viewed in Fig. 2 the brake lever 153 will be moved upwardly to move the ends of the brake shoe toward each other and engage the shoe with the periphery of the brake drum and, thus, either prevent the extracting motor pulley 18 from rotating or bring the pulley and thus the basket to a stop.

With particular reference to Figs. 1 and 8, it can be seen that the outer door 29 is pivotally mounted at 159 to a door-mounting arm 157 intermediate the ends thereof. The mounting arm 157 is in turn pivotally mounted at one end to the door frame 158. A peripheral seal 160 is mounted on the door 29 and is engageable with a flange 161 extending from the door frame 158. The manner of mounting of the outer door assures that the latching force imposed thereon will be evenly distributed about the periphery of the door to obtain effective sealing thereof. To maintain the door in a closed position a pair of links 162, 163 are pivotally mounted at one end to the door frame 158, and are interconnected at their other ends by a pin 165 on which is rotatably mounted a latching cam 166. The latching cam 166 is mounted eccentrically on the pin 165 and has a flat spot 167. As can be seen from Fig. 8 the leftward end of the mounting arm 157 is receivable between the links 162, 163 and in that position is engageable by the latching cam 166. A handle 168 is mounted on the latching cam to permit selective manual rotation of the cam to effect a firm engagement of the peripheral seal 160 with the door frame. When the latching cam 166 is in the latched position as shown in Fig. 8, the flat spot 167 is engaged with the door-mounting arm 157 so that a moderate force is required to move the cam in a clockwise direction to unlatching position, thus preventing inadvertent unlatching of the door. To provide positive locking of the outer door 29 during extraction, an aperture 169 is provided in the door frame to receive the locking rod 32 of the safety lock 31. The rod 32 when received in the aperture 169 prevents the links 162, 163 from being moved in a clockwise, door-unlatching direction to preclude the door from being opened during extraction.

Thus, it can be seen that there has been provided a combination washing machine and extractor of novel construction having an improved washing action and having an extracting action which obviates the necessity for further drying of the clothes prior to finishing and further obviating the necessity of transferring the clothes or material being washed to a shake-out tumbler in order to unloosen the pack formed during extracting.

From the foregoing description it should be apparent that the present invention is applicable to washing machines which wash with a solution of soap or detergent and water and also machines in which so-called "dry cleaning" is accomplished with a solution of petroleum solvent or the like. It will be understood, therefore, that the term "washing machine" as used herein is intended to refer generally to machines of both such types, while the term "washing" refers generally to immersion and agitation of material in a cleaning solution regardless of the specific type of cleaning solution employed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the langauge used in the following claims is intended to cover all of the generic and specific features of the invention herein described and all statements of the scope of the invention which, as a matter of language, might be said to fall therebetween.

We claim:

1. In a combination washing machine and extractor, a horizontally disposed cylindrical tub having vertical enclosing end walls, a cylindrical clothes basket rotatably and coaxially mounted within said tub, means forming an access opening in one of said end walls, a door frame mounted on said one end wall and disposed about said opening, a mounting arm pivotally mounted at one end on said frame, a door constructed to seal said opening and pivotally mounted on its vertical centerline on said mounting arm intermediate the ends of said arm, a pair of links pivotally mounted at one end on said door frame and spaced apart to receive therebetween the other end of said door arm when said door is in a closed position, a circular cam eccentrically and rotatably mounted between said links and having a flat spot registering with the maximum throw of said cam and engageable with the other end of said mounting arm when said arm is received between said links, an operating handle on said cam whereby said cam may be selectively rotated into locking engagement with said mounting arm, a locking rod movable into obstructing relationship with said links when said cam is engaged with said mounting arm, means forming an aperture in said door frame having a longitudinal axis parallel to the pivotal axis of said links and constructed to slidably receive said rod, an electrical motor drivingly engaged with said basket to rotate said basket during use of the machine as an extractor, an electrical switch having an actuating element engageable with said door when said door is in a closed position and connected to said motor whereby the energizing of said motor is precluded when said door is not fully closed, and means to move said rod into obstructing relationship with said links upon energizing of said motor.

2. In a combination washing machine and extractor, a rotatably mounted and horizontally disposed cylindrical clothes basket having a perforated peripheral wall and a diametrical imperforate wall dividing said basket into two semi-cylindrical compartments, end walls enclosing said basket, means forming an access opening in one of said end walls communicating with one of said compartments, a door hingedly mounted on said one end wall adjacent the radially inner edge of said opening, a pair of latches on said door each comprising an operating arm pivotally mounted at one end to said door, a latch bolt slidably and pivotally mounted at one end intermediate the ends of said operating arm, a guide block mounted on said door and having means forming an aperture in which said bolt is slidably received, a portion of said guide block extending beyond the adjacent edge of said door and being engageable with said one end wall when said door is closed, a pair of strikes mounted on said one end wall, said bolts respectively receivable within said strikes when said door is closed, said operating arms extending toward each other and having their other ends pivotally and slidably connected whereby said bolts may be simultaneously moved into and out of engagement with said strikes, and a spring urging each of said operating arms in a latching direction.

3. In a combination washing machine and extractor, a horizontally disposed cylindrical tub with vertical enclosing end walls, means forming an access aperture in one of said end walls disposed above the horizontal cross-sectional centerline of said tub, an outer door mounted on one of said end walls and movable into and out of closing relationship with said aperture, a cylindrical washbasket rotatably and coaxially mounted within said tub and provided with enclosing end walls and an imperforate diametrical wall extending the full length of said basket to divide the basket into two semi-cylindrical compartments, means forming a pair of access openings in one of said basket end walls, each of said openings being registrable with said access aperture whereby material to be washed may be placed in either of said compartments of said basket, an inner door for each of said openings hingedly mounted on said one end wall of said basket adjacent the radially innermost edge of said openings and constructed to be extendable through said access aperture when in an open position, a pair of latches mounted adjacent the radially outer edge of each of said inner doors, each of said latches comprising an operating arm pivotally mounted at one end to an inner door, a latch bolt pivotally and slidably mounted at one end intermediate the ends of said operating arm, and a guide block mounted on said inner door having means for slidably receiving said bolt, each of said latches being disposed eccentrically of the pivotal axis of its associated door whereby said inner doors will tend to move to an open position when in registry with the access aperture of said tub, a strike associated with each of said bolts and mounted on said one end wall of the basket, means forming a bolt receiving aperture in each of said strikes, the other ends of the operating arms of each pair of latches being in pivotal and sliding engagement whereby the latches in each pair may be operated simultaneously, and a spring associated with each latch and urging said operating arms in a latching direction.

References Cited in the file of this patent

UNITED STATES PATENTS

| | | |
|---|---|---|
| 160,570 | Carver | Mar. 9, 1875 |
| 1,737,115 | Jones | Nov. 26, 1929 |
| 1,739,911 | McMurray | Dec. 17, 1929 |
| 1,893,398 | Chamberlin | Jan. 3, 1933 |
| 2,161,604 | Watts | June 6, 1939 |
| 2,166,294 | Hetzer | July 18, 1939 |

(Other references on following page)

UNITED STATES PATENTS

| | | |
|---|---|---|
| 2,226,360 | Spickelmier et al. | Dec. 24, 1940 |
| 2,302,012 | Dyer | Nov. 17, 1942 |
| 2,316,669 | Busi | Apr. 13, 1943 |
| 2,324,356 | Brown | July 13, 1943 |
| 2,447,848 | Edwards | Aug. 24, 1948 |
| 2,540,168 | Kahn | Feb. 6, 1951 |
| 2,540,717 | Diether | Feb. 6, 1951 |
| 2,549,274 | Winborn | Apr. 17, 1951 |
| 2,574,251 | Dinley | Nov. 6, 1951 |
| 2,579,472 | Chamberlain et al. | Dec. 25, 1951 |
| 2,701,643 | Spencer | Feb. 8, 1955 |
| 2,708,293 | Sherman | May 17, 1955 |
| 2,754,670 | Lawson | July 17, 1956 |

FOREIGN PATENTS

| | | |
|---|---|---|
| 9,919 | Great Britain | June 23, 1894 |
| 54,575 | Denmark | Mar. 28, 1938 |
| 324,297 | Germany | Aug. 26, 1920 |
| 665,045 | Germany | Sept. 15, 1938 |